United States Patent
Mikijelj et al.

(10) Patent No.: US 7,309,672 B2
(45) Date of Patent: Dec. 18, 2007

(54) LIGHTWEIGHT BORON CARBIDE MATERIALS WITH IMPROVED MECHANICAL PROPERTIES AND PROCESS FOR THEIR MANUFACTURE

(75) Inventors: Biljana Mikijelj, Cerritos, CA (US); Georg Victor, Kempten (DE); Karl A. Schwetz, Sulzberg (DE)

(73) Assignee: Ceradyne, Inc., Costa Mesa, CA (US)

( * ) Notice: Subject to any disclaimer, the term of this patent is extended or adjusted under 35 U.S.C. 154(b) by 112 days.

(21) Appl. No.: 11/174,689

(22) Filed: Jul. 5, 2005

(65) Prior Publication Data

US 2007/0010391 A1    Jan. 11, 2007

(51) Int. Cl.
*C04B 35/563* (2006.01)

(52) U.S. Cl. .................. 501/87; 501/96.4; 501/98.4

(58) Field of Classification Search .................. 501/87, 501/96.4, 98.4, 98.6
See application file for complete search history.

(56) References Cited

U.S. PATENT DOCUMENTS

| | | | |
|---|---|---|---|
| 4,097,293 A * | 6/1978 | Komeya et al. | ............. 501/87 |
| 5,330,942 A | 7/1994 | Sigl et al. | |
| 5,543,370 A | 8/1996 | Sigl et al. | |
| 2006/0188348 A1 * | 8/2006 | Yeckley et al. | ............. 407/119 |
| 2006/0189474 A1 * | 8/2006 | Yeckley et al. | ............... 501/87 |

* cited by examiner

*Primary Examiner*—Karl Group
(74) *Attorney, Agent, or Firm*—Leonard Tachner

(57) ABSTRACT

This disclosure describes sintered bodies comprising about 90 wt % to about 99 wt % of boron carbide, having a B:C atomic ratio ranging from 3.8 to 4.5:1; 0 to 1 wt % free carbon; 0 to 1 wt % BN or AlN, remainder an oxide binder phase; said sintered body having a uniform microstructure composed of substantially equiaxed grains of said boron carbide; the oxide binder phase comprising at least a rare earth aluminate and optionally $Al_2O_3$ or other ternary or binary phases of rare earth oxide-alumina systems; the binder phase being present in form of pockets at the multiple grain junctions and the density of no more than 2.6 g/cm$^3$. Also described is a manufacturing process for the above described substantially pore-free, sintered boron carbide materials with high strength and fracture toughness, which can be used for production of large-area parts. This is achieved by liquid phase low temperature-low pressure hot pressing of boron carbide in an argon atmosphere.

4 Claims, 1 Drawing Sheet

LIGHTWEIGHT BORON CARBIDE MATERIALS WITH IMPROVED MECHANICAL PROPERTIES AND PROCESS FOR THEIR MANUFACTURE

BACKGROUND OF THE INVENTION

1. Field of the Invention

The present invention relates to substantially pore-free boron carbide sintered bodies with a density of not more than 2.60 g/cm$^3$ and improved mechanical properties, and to a process for their manufacture.

2. Background Art

Boron carbide, $B_4C$, is a lightweight solid (density, 2.52 g/cm$^3$) that has high hardness and a high resistance to abrasive wear and has been used mainly as an abrasive. In dense, sintered form it has been applied as armor for bulletproof body vests, for vehicles and aircraft, as wear resistant linings such as sand blasting nozzles and as control rods in nuclear reactors.

Densification of boron carbide to relative densities of above 95% TD (theoretical density) typically requires small additions of amorphous carbon as a sintering aid and takes place at temperatures of at least 2100° C. Nevertheless for full densification (>99% TD) a hot pressing treatment is required. Boron carbide has the disadvantage of high brittleness, i.e. monolithic boron carbide ceramics have a very low fracture toughness which varies between 2.1 and 2.6 MPa·m$^{1/2}$.

Self-bonded boron carbide has therefore not hitherto become established in applications as a structural ceramic, where strong and tough components are required. Fracture toughness of boron carbide armor should be improved, since according to LaSalvia [Ceram. Sci. and Eng. Proceedings 23, 213-220 (2002)] the armor ceramics should have both high hardness and high toughness to prevent penetration of the projectile.

Attempts have therefore been made to reinforce boron carbide, like other brittle monolithic ceramics, by dispersion of particulate hard materials. Thus, U.S. Pat. No. 5,543,370 to Sigl et al., for example discloses the toughening of boron carbide by the addition of titanium diboride ($TiB_2$) and free carbon. The solid state sintered and HIP post-densified composites (HIP-conditions 2100° C., 200 MPa argon pressure) with 20 and 40 vol-% $TiB_2$ exceed both the toughness and also the strength of pure boron carbide, with four-point flexural strength values in the range of from 550 to 740 MPa and $K_{IC}$ values in the range of from 4.7 to 6.8 MPa·m$^{1/2}$. The sintered densities of these $B_4C$ based composites varied significantly with the amount of $TiB_2$, i.e. 2.90 g/cm$^3$ for 20 vol-% $TiB_2$ and 3.30 g/cm$^3$ for 40 vol-% $TiB_2$. In a similar way to titanium diboride, other borides of the transition metals of the groups 4a to 6a of the Periodic Table, in equilibrium with $B_4C$ can also be used to improve the mechanical properties of boron carbide. EP 1,452,509 A1 to Hirao et al., discloses a boron carbide chromium diboride ($CrB_2$) composite, sintered at 2030° C. containing a dispersion of 10 to 25 mol-% $CrB_2$ particles, and having a 4-point flexural strength in the range of 436 to 528 MPa and a fracture toughness of at least 3.0 MPa·m$^{1/2}$, respectively. While the above mentioned composite materials are formed by mixing the desired metal boride phases and subsequent sintering, processes have also been described in which the desired metal boride composition is only formed after a suitable reaction of the starting materials during the sintering step. Skorokhod and Krstic ["High Strength—High Toughness $B_4C$—$TiB_2$ Composites", J. Mater. Sci. Lett., 19, 237-239 (2000)] have successfully fabricated a 85 $B_4C$-15 $TiB_2$ (vol-%) composite with a flexural strength of 621 MPa and a fracture toughness of 6.1 MPa·m$^{1/2}$ (measured by the SENB method with a 100 μm notch width) by reaction hot pressing of a sub-micron particle sized boron carbide powder using additions of sub-micron size $TiO_2$ and carbon at a temperature of 2000° C. The formation of uniform distributed $TiB_2$ particles (<5 μm grain size) was in accordance with the reaction

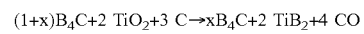

$$(1+x)B_4C+2\ TiO_2+3\ C \rightarrow xB_4C+2\ TiB_2+4\ CO$$

The high strength of this material was attributed to the combination of high fracture toughness and fine microstructure. A further improvement of the mechanical properties of 80 $B_4C$—20 $TiB_2$ (mol-%) composites is disclosed in EP 1,452,509 A1 to Hirao et al., wherein via use of nanometer size $TiO_2$ powder, carbon black and sub-micron particle sized $B_4C$ powder after reaction hot pressing at 2000° C. with a very high pressure of 50 MPa, dense sintered bodies (density 2.82 g/cm$^3$, 100% TD) with both high flexural strength (720-870 MPa) and high toughness (2.8 to 3.4 MPa·m$^{1/2}$, SEPB method) could be obtained. The improvement of mechanical properties was attributed to the fine-grained microstructure and uniform dispersion of $TiB_2$ particles.

However, the proposed toughening method by dispersion of metal borides has technological disadvantages in view of the used densification processes (1) and concerning other material properties of the densified end product (2).

(1) Densification Processes

Solid state sintering of $B_4C$—$TiB_2$ composites requires high sintering temperatures in the range of from 2000 to 2175° C. Sintering of $B_4C$—$CrB_2$ composites is possible at 2030° C., however densification is incomplete (residual porosity above 2%). Via reaction hot pressing at 2000° C. 100% dense $B_4C$—$TiB_2$ composites can be obtained, however, the high molding pressure of 50 MPa used (see [0056] in EP 1,452,508 to Hirao et al.) restricts hot pressing to small area parts. Moreover, homogeneous distribution of ultra-fine $TiO_2$ and carbon black in a methanol-$B_4C$ dispersion and drying of the flammable slurry are delicate processes and difficult to scale-up.

(2) Other Material Properties of Densified End Product

Since for toughening by particle dispersion the optimum volume content of added or in-situ grown particles is relatively high, densities of composites were increased, e.g., to 2.82 g/cm$^3$ for a 15 vol-% $TiB_2$ and to 3.32 g/cm$^3$ for a 40 vol-% $TiB_2$ composite, respectively. However, for lightweight armor application the density should remain as low as possible (below 2.60 g/cm$^3$). Further, since hardness of $TiB_2$ is significantly lower (comparable only to SiC), the resulting hardness of the $B_4C$—$TiB_2$ composites is inferior to the commercial grades of monolithic $B_4C$ ceramics. Therefore, the relatively high densities combined with a lower hardness inhibits the use of tough $B_4C$—$TiB_2$ composites as a lightweight ceramic armor material.

Another approach to produce tough and high strength $B_4C$ ceramics is to use liquid phase sintering. Lee and Kim [J. Mat. Sci. 27 (1992), 6335-6340] have shown that the addition of alumina, $Al_2O_3$, promoted the densification of boron carbide and a maximum density of 96% of theoretical can be obtained with 3 wt-% alumina-doped $B_4C$ sintered at 2150° C., i.e. above the melting point of $Al_2O_3$. The microstructure showed equiaxed $B_4C$ grains with a mean grain size of about 7 μm. However, as the addition of $Al_2O_3$ exceeded 3 wt-% exaggerated grain growth occurred, which was attributed to the liquid phase.

It has been reported by Kim et al., [J. Am. Ceram. Soc. 83, No. 11, 2863-65 (2000)], that by hot pressing of $B_4C$ with alumina additions up to 5 vol-% at 2000° C. the mechanical properties can be remarkably increased as compared to undoped, hot pressed $B_4C$ of 88% relative density. Fracture toughness increased steadily with the addition of $Al_2O_3$ from ~3 MPa·m$^{1/2}$ (2.5 vol % $Al_2O_3$) up to 3.8 MPa·m$^{1/2}$ (10 vol-% $Al_2O_3$). However the achieved flexural strength was below 560 MPa.

The use of yttria ($Y_2O_3$) containing sintering aids was first described in two Japanese Patent Applications, JP 62012663 to Kani (pressureless sintering of $B_4C$ with mixed additions of 4 wt-% Al+1 wt-% Si+3 wt-% $Y_2O_3$ at 2000° C.) and JP 08012434 to Kani (pressureless sintering with 0.5 wt-% Al+3 wt-% $Y_2O_3$ at 2000° C.). It was shown that instead of $Y_2O_3$ one can also use other oxides, nitrides, carbides or borides, the net result being the same. However, these processes are complicated due to sintering in atmospheres containing high aluminum partial pressures. Furthermore, no improvement in fracture toughness of $B_4C$ materials was reported.

The possibility to improve fracture toughness of boron carbide with yttria or mixed additions of yttria in combination with other oxides was first demonstrated in U.S. Pat. No. 5,330,942 to Holcombe et al., and CN 1,438,201 to Li et al., respectively.

According to the method with is disclosed in U.S. Pat. No. 5,330,942, the fracture toughness of $B_4C$ can be increased to 3.9 MPa·m$^{1/2}$ by vacuum sintering at 1900 to 1975° C. using powder compacts of composition 97.5 $B_4C$-2.5 carbon (wt-%) packed in a yttria grit of 0.15 to 1.4 mm grain size. The vacuum allows yttrium oxide vapor to penetrate the powder compact promoting reaction-sintering of carbon-doped $B_4C$ to full density (2.62 g/cm$^3$). The final composite showed an overall yttrium content of 9.4 wt-%, the yttrium being present in the form of Y—B—O—C containing 5 μm particulates dispersed evenly in a matrix of 40 μm boron carbide grains. X-ray diffraction identified that yttrium boride and yttrium borocarbide coexist with $B_4C$. However, owing to uncontrolled gas infiltration this method is as yet unsuitable for mass production of liquid phase sintered $B_4C$.

The Chinese patent application CN 1,438,201 also discloses a method to increase the toughness of boron carbide while maintaining a reasonable hardness and intermediate strength. The basis of the method is to use liquid phase sintering under vacuum or streaming argon of powder compacts comprising $B_4C$ powder (average particle size 0.6 to 3.5 μm) and 1 to 28 wt-% additions of $Y_2O_3$ in combination with $Al_2O_3$ or aluminum nitride (AlN) and any one of $La_2O_3$ or $CeO_2$ components. The $B_4C$ material of example 4 (starting from a sub-micron powder mixture 95.2 $B_4C$-0.8 $La_2O_3$-1.7 AlN-2.3 $Y_2O_3$, wt-%) obtained by pressureless sintering at 1920° C. for 270 minutes (i.e. 4.5 hours hold at max. temperature) was characterized with regard to mechanical properties: Vickers hardness 2950, four-point bend strength 520 MPa and fracture toughness 5.4 MPa·m$^{1/2}$. No indication of the microstructure and the chemical composition of the final $B_4C$ sintered bodies was given. However, with the proposed method of pressureless sintering, in particular in view of the used atmosphere (vacuum/streaming argon gas), the long hold times at temperatures of around 1900° C., it is necessary to consider reactions between boron carbide and the rare earth oxides of the liquid phase. Reactions according

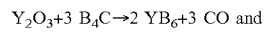

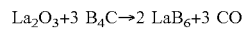

result in formation of rare earth borides, in weight losses (evolution of carbon monoxide) and in a decrease in sintered density of the bodies. Due to this, production of large parts using this process would be difficult to control. This is supported by experiments of the present inventors who, while reproducing the example 4 of CN 1,438,201, obtained very porous bodies (sintered density of only 2.05 g/cm$^3$, corresponding to 80% of theoretical density). The obtained samples were found to contain rare earth hexaboride ($LaB_6$) and rare earth borocarbide ($YB_2C_2$) in addition to boron carbide. Thus, due to the decomposition reactions the liquid phase was depleted to such an extent that is was not possible to make dense bodies.

The present invention differs from the teachings of U.S. Pat. No. 5,330,942 and CN 1,438,201 relating to (1) a low-temperature low-pressure hot-pressing densification without any appreciable reaction between $B_4C$ and the liquid phase, (2) a new $B_4C$ material containing a rare earth aluminate as main component of the oxide binder phase, and having unique mechanical properties.

SUMMARY OF THE INVENITON

It is one object of the present invention to overcome the above described drawbacks of liquid phase sintered $B_4C$ bodies and to provide substantially pore-free sintered $B_4C$ materials which can be used as tough structural ceramics and lightweight armor ceramics which exhibit high strength, toughness and hardness. This objective is achieved by sintered bodies comprising about 90% to about 99% by weight of boron carbide, having a B:C atomic ratio ranging from 3.8 to 4.5:1; 0 to 1% by weight free carbon; 0 to 1% by weight BN or AlN, and remainder an oxide binder phase; said sintered body having a uniform microstructure composed of substantially equiaxed grains of said boron carbide; the oxide binder phase comprising at least a rare earth aluminate and optionally other ternary or binary phases of rare earth oxide—alumina systems; the binder phase being present in form of pockets at the multiple grain junctions. The sintered bodies can contain small amounts (total less than 2% by weight) of non-oxide impurities like free carbon (carbon non-covalently bound to boron in $B_4C$), boron nitride or aluminium nitride, which are present as a result of the process or as residue in the powder mixture used as starting material. In the context of the present invention rare earth (RE) is to be understood as meaning the metals Sc, Y, the lanthanides and actinides. Preferably, the rare earth metal is yttrium.

In one embodiment of the material of the present invention, the oxide binder phase comprises two yttrium aluminates, $YAlO_3$ and $Y_3Al_5O_{12}$. The sintered body has the following properties: density of not more than 2.60 g/cm$^3$, the boron carbide grains having a mean grain intercept size between about 5 to about 12 μm, porosity not more than 1.0%, hardness (Knoop, 300 g load) greater than 2400, 4-point flexural strength in the range of about 400 to about 600 MPa, and fracture toughness of at least 3.0 MPa·m$^{1/2}$ (measured by the Chevron Notch method).

In a preferred embodiment of the material of the present invention, the oxide binder phase comprises yttrium aluminate $Y_3Al_5O_{12}$ and alumina from 0 to 50% by weight based on the total binder phase content. The sintered body has the following properties: density of not more than 2.60 g/cm$^3$, the $B_4C$ grains having a mean grain intercept size ranging from 0.7 to about 3 μm, porosity below 0.5%, hardness (HK0.3) greater than 2500, 4-point flexural strength greater than 700 MPa, and fracture toughness greater than 3.5 MPa·m$^{1/2}$ (measured by the Chevron Notch method).

It is another object of the present invention to provide a process for manufacture of the above described substantially pore-free sintered boron carbide materials capable also of production of large-area parts. This object is achieved by liquid phase hot pressing of boron carbide comprising forming a powder mixture comprising boron carbide having a B:C atomic ratio in the range of 3.8 to 4.5:1 and up to at most 10% by weight of a sintering aid selected from the group of RE-aluminates, mixtures of at least one RE-aluminate with alumina or AlN, and mixtures of a rare earth oxide with alumina or AlN; and hot pressing the powder mixture under a die pressure of below 15 MPa at a temperature below approximately 2000° C. in an argon atmosphere (so-called "low temperature-low pressure hot pressing method"). In a preferred embodiment of the process of the present invention the powder mixture comprises boron carbide having a mean particle size of about 0.4 to about 1.0 μm and up to at most 10% by weight of a sintering aid selected from the group of yttrium aluminates ($Y_3Al_5O_{12}$, $YAlO_3$, $Y_4Al_2O_9$), mixtures of at least one yttrium aluminate with alumina or AlN, and mixtures of yttria with alumina or AlN, and hot pressing the powder mixture under a die pressure of from 6.9 to 13.8 MPa (1000-2000 psi) at a temperature of below approximately 1850° C. in an argon atmosphere.

Teachings of the present invention show that, unexpectedly, by low pressure-low temperature hot pressing boron carbide using the yttria-alumina system (forming a liquid phase), with the proportion of alumina in the mixture being from 30 to 60% by weight of alumina, not only sub-micron particle sized $B_4C$ powders but also low-cost, relatively coarse-grained $B_4C$ powders can be densified without exaggerated grain growth to virtually theoretical density. The $B_4C$ bodies so produced show both high fracture toughness and hardness but exhibit lower strength relative to the finer grained powder, due to their coarser microstructure. The strength of the material of this embodiment is nevertheless higher than the state of the art hot pressed boron carbide. Therefore in another embodiment of the process of the present invention the powder mixture comprises boron carbide having a mean particle size of about 4 to about 8 μm and up to at most 10% by weight of a sintering aid selected from the group of yttrium aluminates ($Y_3Al_5O_{12}$, $YAlO_3$, $Y_4Al_2O_9$), mixtures of at least one yttrium aluminate with alumina or AlN, and mixtures of yttria with alumina or AlN, and hot pressing the powder mixture under a die pressure of from 6.9 to 10.3 MPa (1000-1500 psi) at a temperature of below 2000° C. in an argon atmosphere.

As compared with the existing state of the art in hot pressing of $B_4C$ using graphite tooling and high temperatures of at least 2000° C., typically over 2100° C., production costs for the material can be considerably reduced. High temperatures and pressures often lead to damage of the graphite tooling in form of edge fracture due to reactions with the densified material and due to high temperature deformation of the tooling. The process of the present invention considerably reduces the reaction between the densified material and the graphite tooling, as well as the tooling deformation.

BRIEF DESCRIPTION OF THE DRAWINGS

The aforementioned objects and advantages of the present invention, as well as additional objects and advantages thereof, will be more fully understood hereinafter as a result of a detailed description of a preferred embodiment when taken in conjunction with the following drawings in which.

DETAILED DESCRIPTION OF PREFERRED EMBODIMENTS

Figure 1:
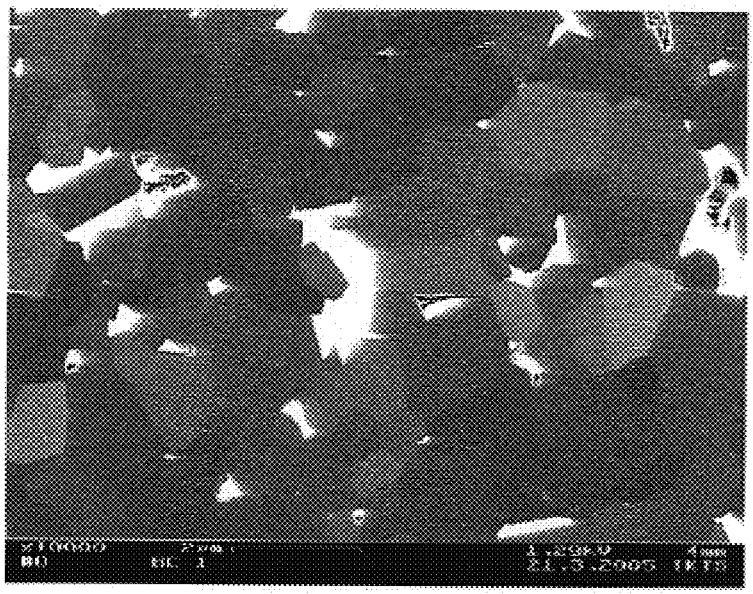
FIG. 1 is a field-emission SEM-micrograph (magnification 10 000×) showing the substantially pore-free microstructure of the preferred material of the present invention, prepared by hot pressing at 1825° C. using a sub-micron particle sized $B_4C$ powder (mean grain size ~0.6 μm) and 7.6% by weight sintering additions based on a mixture of 68 wt-% $Y_3Al_5O_{12}$ and 32 wt-% AlN.

In liquid phase sintering it is desirable to have a liquid that wets the matrix grains and allows particle rearrangement to occur in the presence of the liquid phase. The liquid phase sintering aids and the ratio of liquid phase sintering aids may be selected based on the melting points of the rare earth aluminates or the liquid temperatures for given ratios of $RE_2O_3$ to alumina and $RE_2O_3$ to AlN in the systems $RE_2O_3$—$Al_2O_3$ and $RE_2O_3$—AlN, respectively. The role of aluminum nitride, AlN, as a component in the sintering additions is partly seen in its reaction with boron oxide according

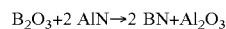
$B_2O_3 + 2\, AlN \rightarrow 2\, BN + Al_2O_3$ when oxygen-rich boron carbide starting powders are used. Further it is known that aluminum nitride contributes to liquid formation through the presence of eutectics in the systems AlN—$RE_2O_3$.

Preferably the sintering additive used is a mixture of AlN with a compound from the group consisting of $RE_2O_3$ or RE-aluminates in powder form as grain fractions of 10 μm and finer, preferably 7 μm and finer, with mean particle sizes in the range of 1 to 2 μm. The proportion of AlN in the mixture with the $RE_2O_3$ additive corresponding to an $RE_2O_3$:AlN molar ratio in the range from 1:4 to 1:14, and in the mixture with an RE-aluminate to at least 10 to 50% by weight AlN. Particularly preferable for liquid phase sintering of coarse-grained $B_4C$ powders, a mixture of yttria and alumina is used, the proportion of alumina in the mixture with yttria is from 30 to 60% by weight of alumina, corresponding to melting temperatures between 1940 and 1760° C.

The amount of sintering additions should be in the range of from about 1.0 to about 10% by weight. With amounts below about 1.0% by weight sufficient densification cannot be achieved. In order to achieve high hardness in combination with the other properties the amount of sintering additions should not exceed 10% and preferably 8.5% by weight. Preferably an amount of sintering additions within the range of from 2.5 to 7.5% by weight, is used.

For carrying out the process of the invention it is preferable to use as a starting material boron carbide powders with a purity of at least 97% by weight, which means that the sum of the boron content and the carbon content should be at least a total of 97% by weight, at a B:C atomic ratio of 3.8 to 4.5:1. Metallic impurities can be tolerated up to a total of 0.5% by weight. The remaining impurities, up to 100% by weight, are distributed among oxygen and nitrogen in form of adherent boron oxide and boron nitride. Typical powders have adherent boron oxide contents less than 2.0% by weight and nitrogen contents less than 0.5% by weight, respectively. As a measure of the required particle fineness, use is advantageously made of the average particle size (measured by laser diffraction) and the specific surface area (measured by the BET-method). Boron carbide powders can be used with an average particle size in the range of 0.3 to 8 µm and a specific surface area in the range of 1 to 25 m²/g, respectively.

The blending of boron carbide, sintering additives and optionally organic binders for producing pre-shaped parts is affected in a manner known per se, for example by means of dry homogenisation or by dispersion in a liquid forming a slurry which is subsequently dried (e.g., spray-dried or similar). Suitable organic binders can be added to the powder mix to facilitate shape forming. The dried powder mix or the pre-shaped part is then placed into a graphite hot press die.

If pre-shaped parts are employed, the organic binders can be removed in a separate furnace step at temperatures in the range between 100 and 600° C. in an inert atmosphere or air, or they can be removed during the hot pressing step.

After filling the molds the temperature is elevated by heating and depending on the $B_4C$ powder grain size, the size of the furnace and the parts, the densification is accomplished at temperatures between 1800 and 1950° C. while applying a relatively low pressure of between 6.9 and 13.8 MPa.

During cooling of the hot pressed bodies, the liquid phase solidifies forming a solid, crystalline binder phase, consisting of at least one RE-aluminate (e.g., $Y_3Al_5O_{12}$) and optionally $\alpha$-$Al_2O_3$, which is preferentially formed at the multiple junctions between the boron carbide crystals.

The hot pressing is performed in an inert atmosphere such as argon or helium. Temperatures of about 1950° C. and higher and pressures higher than 15 MPa do not yield further increase in density. Processing times above the liquidus temperature should be limited so as to inhibit grain growth. The times should be less than about 3 hours, with time at the maximum sintering temperature preferably less than two hours (depending on the load size).

The substantially pore free sintered boron carbide bodies produced according to the invention are characterized by the combination of the following properties:
1. Sintered density of not more than 2.60 g/cm³
2. Residual porosity of not more than 1% (based on density)
3. High hardness demonstrated by Knoop-300 g values of from 2400 to 2700, i.e. hardness is almost equal or higher as given in the literature for single-phase dense $B_4C$ [A. Lipp et al.: "Hardness and hardness determination of non-metallic hard materials, I. Boron Carbide", Ber. Dtsch. Keram. Ges. 52, No. 11, 335-338 (1975), in German]
4. High four-point flexural strength in the range of from 400 to 820 MPa·m$^{1/2}$
5. High fracture toughness demonstrated by $K_{IC}$ values of from 3.0 to 4.0 MPa·m$^{1/2}$, according to the Chevron Notch method.

The materials have, in addition, a microstructure consisting of substantially equiaxed boron carbide grains having a mean intercept size of from about 0.7 to about 12 µm and a homogeneously distributed oxide binder phase visible at the multiple grain junctions in accumulations predominantly smaller than the $B_4C$ grains in diameter. The presence of rare earth aluminates and optionally alumina as crystalline compounds in the oxide binder phase is detectable using SEM and EDX micro analysis (materials with binder phase contents below ~5% by weight) as well as by X-ray powder diffraction analysis (materials with binder phase contents of more than 5% by weight).

The materials of the present invention are suitable in particular for the manufacture of armor plates, of wear resistant components such as tools for the cutting machining of non-ferrous metals, wood, plastic and ceramic green bodies, and air jet nozzles and other structural components that require hardness, high strength and toughness.

The invention is further clarified by the following examples. Examples 1 through 10 show the low-temperature low-pressure hot pressing of sub-micron particle sized $B_4C$ together with properties of final $B_4C$ materials. Examples 11 through 18 show that liquid phase hot pressing of relatively coarse grained $B_4C$ starting powders lead to $B_4C$ materials of improved mechanical properties.

Testing Procedures

The densities were determined using the Archimedes technique in water. The relative density, in % TD (Theoretical Density), is based on the theoretical density of the $B_4C$ hot pressed materials.

The residual porosity (P) was calculated from the relative density according to

% P=100-% TD.

The flexural tests were conducted on 3×4×50 mm test bars with surfaces ground according to ASTM C1161 (Method B). Flexural strength values ($\sigma_B$, 4-pt) were typically mean values of 10 or more measurements.

To determine the fracture toughness of the $B_4C$ materials the Chevron Notch method was used (ASTM C1421).

The Knoop Hardness (HK0.3), was measured (5-10 indentations per sample) with a Knoop diamond at a load of 300 g.

For micro-structural characterization, samples were polished to 1 µm diamond finish and etched with diluted sulfuric acid or by electrolytic etching. The intercept method was employed to measure the mean intercept grain size.

EXAMPLES 1-10

A sub-micron grade $B_4C$ powder 1 µm and finer, with an average particle size of 0.6 µm was mixed in a water suspension with the sintering additives by stirring.

The $B_4C$ powder had a specific surface area of 17.6 m²/g and had the following chemical composition:

| | |
|---|---|
| B total | 76.7 wt-% |
| C total | 20.4 wt-% |
| C free | 0.8 wt-% |
| $B_2O_3$ | 1.5 wt-% |
| N | 0.3 wt-% |
| Si | 400 ppm |

-continued

| | |
|---|---|
| Fe | 500 ppm |
| Al | 100 ppm |
| Ti | 600 ppm |
| Ca | 10 ppm |

(taking into account the free carbon and the boron present as $B_2O_3$ and the BN, corresponds to a B:C atomic ratio of this powder is 4.3).

Sintering additives used were: fine aluminum nitride (AlN) powder in combination with fine yttrium aluminate, ($Y_3Al_5O_{12}$); AlN in combination with yttria; alumina in combination with yttria; and $Y_3Al_5O_{12}$ in combination with alumina. The sintering additives had an average particle size finer than 10 μm and a specific surface area of 2-7 $m^2/g$. Aqueous slips were prepared in accordance with the formulations given in Table 1, with variation of the type and the quantity of the sintering additives within the limits of 0 to 7.6% by weight added sintering aids, 6 parts by weight of organic pressing aids also being used per 100 parts by weight $B_4C$ plus sintering additive (=doped sintering powder). The homogenized slips with a 60% powder concentration were dried by means of a spray drier. Free flowing, pressable granules were obtained (mean granule diameter 50-70 μm) with a residual moisture content of approximately 0.3% by weight. Billets with dimensions 4.1×4.1 inch were dry pressed in a steel die (~1 inch thick) from each composition.

Formed parts were loaded in graphite hot press dies, and the parts were hot pressed in an argon atmosphere with the maximum temperatures and pressures being 1825° C. and 10.3 Mpa, respectively. Examples 1-8 show conditions of the present teachings. One formulation with $Y_3Al_5O_{12}$—AlN sintering aids was hot pressed at 2000° C. (instead of 1825° C.) with identical pressure load of 10.3 MPa to show influence of a too high sintering temperature on the $B_4C$ material properties.

Also, the sub-micron $B_4C$ powder without sintering additions was hot pressed using as sintering parameters 1825° C./10.3 MPa (Example 9) and 2100° C./30.9 MPa (Example 10), demonstrating that high temperature and high pressure are necessary for full densification without sintering aids.

TABLE 1

Composition of the powder batches (% by weight)

| Example No. | $B_4C$* | $Y_2O_3$ | YAG** | AlN | $Al_2O_3$ | Sintering aids, total | Hot press temperature (° C.)/pressure (MPa) |
|---|---|---|---|---|---|---|---|
| 1 | 92.39 | — | 5.16 | 2.45 | — | 7.6 | 1825/10.3 |
| 2 | 96.18 | — | 2.59 | 1.23 | — | 3.8 | " |
| 3 | 92.96 | 2.24 | — | 4.80 | — | 7.0 | " |
| 4 | 96.48 | 1.12 | — | 2.40 | — | 3.5 | " |
| 5 | 95.00 | 2.00 | — | — | 3.00 | 5.0 | " |
| 6 | 97.50 | — | 2.00 | — | 0.50 | 2.5 | " |
| 7 | 98.00 | 0.80 | — | — | 1.20 | 2.0 | " |
| 8 | 92.39 | — | 5.16 | 2.45 | — | 7.6 | 2000/10.3 |
| 9 (prior art) | 100 | — | — | — | — | 0.0 | 1825/10.3 |
| 10 (prior art) | 100 | — | — | — | — | 0.0 | 2100/30.9 |

*contains 0.8% free C and 1.5% adherent $B_2O_3$
**$Y_3Al_5O_{12}$ (Y-Al-Garnet)

After cooling down, the parts were removed from the dies and cleaned. The parts separated easily from the graphite dies with exception of part of Example 10 (adhered to the die). Density, porosity, flexural strength, fracture toughness, hardness and grain size were measured. Table 2 gives the hot pressed body properties.

The data shows that the process according to the invention can be carried out with a mixture of $Y_3Al_5O_{12}$ with AlN, mixtures of yttria with AlN, mixtures of yttria with alumina, and a mixture of $Y_3Al_5O_{12}$ with alumina as sintering aid, the net result being similar. The Examples 1-7 show that the low temperature—low pressure hot pressed $B_4C$ bodies possess a density of below 2.60 $g/cm^3$, a relative density of more than 99.5% TD (corresponds to a residual porosity of below 0.5%), a flexural strength of at least 700 MPa, a fracture toughness of at least 3.5 MPa·$m^{1/2}$, and a hardness of at least 2500.

TABLE 2

Hot pressed body properties

| Example No. | Density g/cm³ | Relative Density % TD | Residual Porosity % | Flexural Strength MPa | Fracture Toughness MPa·m^(1/2) | Hardness HK-0.3 kg/mm² | Mean Grain Size, μm |
| --- | --- | --- | --- | --- | --- | --- | --- |
| 1 | 2.59 | 99.8 | 0.2 | 762 | 3.8 | 2510 | 1.2 |
| 2 | 2.55 | 99.7 | 0.3 | 751 | 3.6 | 2650 | 1.6 |
| 3 | 2.58 | 100 | 0.0 | 819 | 3.9 | 2520 | 0.9 |
| 4 | 2.54 | 99.7 | 0.3 | 713 | 3.6 | 2620 | 1.7 |
| 5 | 2.58 | 100 | 0.0 | 802 | 3.7 | 2560 | 1.4 |
| 6 | 2.55 | 100 | 0.0 | 722 | 3.6 | 2680 | 1.9 |
| 7 | 2.53 | 99.6 | 0.4 | 704 | 3.9 | 2670 | 2.1 |
| 8 | 2.59 | 99.8 | 0.2 | 485 | 3.1 | 2550 | 10.5 |
| 9 | 2.23 | 88.5 | 11.5 | — | — | — | — |
| 10 | 2.50 | 99.2 | 0.8 | 526 | 2.4 | 2500 | 4.1 |

The $B_4C$ material of Example 8 was sufficiently densified but strength was at least 30% lower as compared to materials of Examples 1-7. It is apparent from Example 8 that, starting from a sub-micron $B_4C$ powder and liquid phase hot pressing at a temperature of more than about 1950° C., strength is reduced because a coarse-grained microstructure is obtained at such higher temperatures. To anyone familiar with the art, this shows that by optimizing the additives, starting powders and hot pressing conditions, one can optimize the material properties and process manufacturing costs depending on the needs.

It is apparent from Example 9 that a $B_4C$ material with open porosity is obtained by hot pressing (1825° C./10.3 MPa) without using a liquid phase. On the other hand Example 10 shows that the $B_4C$ material obtained by hot pressing without a liquid phase but using enhanced sintering conditions (2100° C./30.9 MPa) was of course sufficiently densified but had a poor fracture toughness of self-bonded $B_4C$ (2.4 MPa·m$^{1/2}$)

FIG. 1 shows the extremely fine-grained microstructure of the B4C material from Example 1 which was hot pressed at 1825° C./10.3 MPa with 7.6% by weight sintering additives based on a $Y_3Al_5O_{12}$—AlN mixture. The $B_4C$ grains (grayish phase) have an equiaxed grain form, a mean grain size of 1.2 μm, and the binder phase (light phase) occurs at inter-granular regions between the $B_4C$ grains. Densification to residual porosities below 0.5% at a temperature of 1825° C. and a low-pressure load of 10.3 MPa (1500 psi) can be attributed to a liquid phase near the $Y_3Al_5O_{12}$—$Al_2O_3$ eutectic composition (70 wt-% $Y_3Al_5O_{12}$-30 wt-% $Al_2O_3$, eutectic temperature 1760° C.). By wet chemical analysis of the B4C material from Example 1, an elemental composition of 71.3 B-20.3 C-0.6 N-2.9 O-2.65 Al-2.19 Y (wt-%) was determined. By X-ray diffraction analysis the yttrium aluminate $Y_3Al_5O_{12}$ and $Al_2O_3$ with very little graphite and boron nitride were identified as secondary phases coexistent with boron carbide.

EXAMPLES 11-19

A standard grade $B_4C$ powder 20 μm and finer with a mean grain size of 6 μm was mixed dry with a "master mix"—a previously slurry homogenized and dried boron carbide, alumina powder (specific surface area 5 m²/g) and a yttria powder (specific surface area 5 m²/g). Also an aqueous slip of this $B_4C$ powder with $Y_3Al_5O_{12}$ powder (specific surface area 4 m²/g) alone was prepared.

The $B_4C$ powder had a specific surface area of 2.5 m²/g and had the following chemical composition:

| | |
| --- | --- |
| B total | 77.5 wt-% |
| C total | 21.2 wt-% |
| C free | 0.9 wt-% |
| $B_2O_3$ | 0.5 wt-% |
| N | 0.3 wt-% |
| Si | 300 ppm |
| Fe | 700 ppm |
| Al | 100 ppm |
| Ti | 200 ppm |
| Ca | 30 ppm |

(which, taking into account the free carbon and the boron present as $B_2O_3$ and the BN, corresponds to a B:C atomic ratio of 4.2).

Total quantity of sintering additives was within the limits 2.0 to 8.3% by weight. The formulations mixed were (A) 2 wt-% $Al_2O_3$, (B) 5 wt-% $Y_2O_3$-3.3 wt-% $Al_2O_3$, (C) 4 wt-% $Y_2O_3$-2.6 wt-% $Al_2O_3$, (D) 3 wt-% $Y_2O_3$-2 wt-% $Al_2O_3$, (E) 2 wt-% $Y_2O_3$-1.3 wt-% $Al_2O_3$, and (F) 5 wt-% $Y_3Al_5O_{12}$.

Binder was added to the powder and the powder was dried, and screened. Billets with dimensions 4.1×4.1 inch were dry pressed in a steel die (~1 inch thick) from each composition. Parts were loaded in graphite hot press dies, and the parts were hot pressed in an argon atmosphere. Compositions (A) through (F) were densified using 1925° C./10.3 MPa as hot pressing parameters (Examples 10-16); in addition, compositions (D) and (E) used lowered hot pressing parameters 1900° C./8.3 MPa (Examples 17 and 18).

After cooling down, the parts were removed from the dies and cleaned. The parts separated easily from the graphite dies.

Density, porosity, strength, toughness, hardness and grain size was measured.

The properties data of the hot pressed B4C bodies according to Examples 11-18 are given in Table 3 and compared to commercially produced $B_4C$ material (Example 19).

Data of Example 19 correspond to a commercial, self-bonded $B_4C$ material, hot pressed using prior art sintering aids.

TABLE 3

Hot pressed body properties

| Example No. (Composition) | Density g/cm³ | Relative Density % TD | Residual Porosity % | Flexural Strength MPa | Fracture Toughness MPa·m^{1/2} | Hardness HK-0.3 kg/mm² | Mean Grain Size, μm |
|---|---|---|---|---|---|---|---|
| 11* (A)  | 2.26  | 84.0   | 16.0   | —   | —       | —    | —    |
| 12 (B)   | 2.59  | 99.0   | 1.0    | 480 | 3.4     | 2410 | 9.4  |
| 13 (C)   | 2.58  | 99.4   | 0.6    | 451 | 3.4     | 2580 | 9.1  |
| 14 (D)   | 2.56  | 99.3   | 0.7    | 417 | 3.3     | 2520 | 9.9  |
| 15 (E)   | 2.54  | 99.3   | 0.7    | 421 | 3.0     | 2470 | 10.3 |
| 16 (F)   | 2.56  | 99.3   | 0.7    | 411 | 3.3     | 2500 | 10.0 |
| 17 (D)   | 2.57  | 99.7   | 0.3    | 436 | 3.4     | 2510 | 9.8  |
| 18 (E)   | 2.54  | 99.3   | 0.7    | 401 | 3.1     | 2500 | 11.1 |
| 19**     | <2.52 | >98.5  | <1.5   | 330 | 2.2-2.6 | 2490 | 10-40 |

*for comparison (using 2% by weight alumina)
**for comparison (commercial $B_4C$ material, prior art)

It is apparent from Example 11 that insufficient densification, i.e. a $B_4C$ material with open porosity, is obtained using low-temperature low-pressure hot pressing of coarse-grained $B_4C$ powder (6 μm, mean grain size) with alumina as sintering aid alone. The Examples 11-18 show that by low temperature—low pressure hot pressing of coarse $B_4C$ with sintering additives based on yttria—alumina mixtures or $Y_3Al_5O_{12}$ alone, $B_4C$ materials can be produced which possess a density of below 2.60 g/cm³, a relative density of at least 99.0% TD (corresponds to a residual porosity of not more than 1.0%), a flexural strength of at least 400 MPa, a fracture toughness of at least 3.0 Mpa·m^{1/2}, and a hardness of at least 2400.

Figure 2:
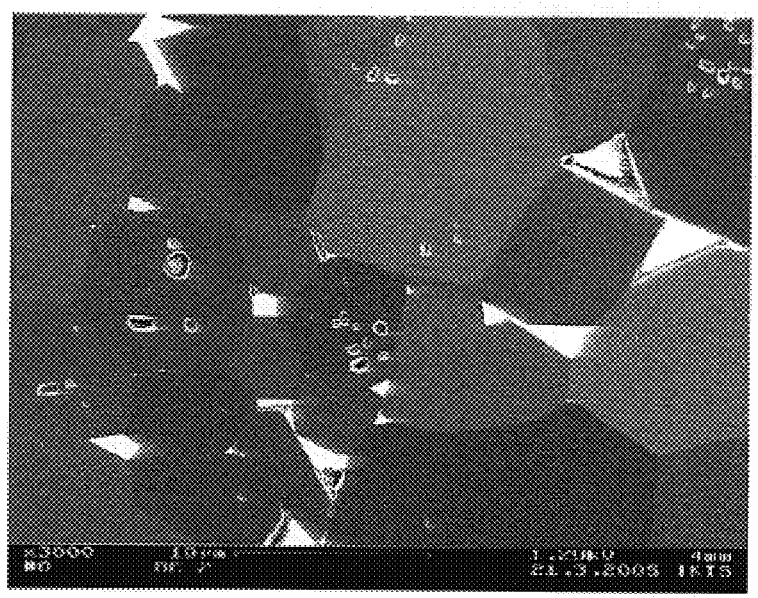
FIG. 2 is a field-emission SEM-micrograph (magnification 3000×) showing the substantially pore-free microstructure of a sintered body of the present invention, prepared by hot pressing at 1925° C. using a relatively coarse-grained $B_4C$ powder (mean grain size, ~6 μm) and 6.6% by weight sintering additions based on a 60 wt-% yttria-40 wt-% alumina mixture.

FIG. 2 shows the microstructure of the $B_4C$ material from Example 13 which was hot pressed at 1925° C./10.3 MPa with 6.6% by weight sintering additives based on an yttria—alumina mixture. The $B_4C$ grains (grayish phase) have an equiaxed grain form, a mean grain size of 9.1 μm, and the binder phase (white) occurs as intergranular inclusions between the $B_4C$ grains. The good densification to residual porosities of not more than 1.0% at temperatures of 1900-1925° C. and low pressure loads can be attributed to a liquid phase near the yttrium aluminate composition (60 wt-% $Y_2O_3$-40 wt-% $Al_2O_3$, liquation above 1870° C.).

By wet chemical analysis of the $B_4C$ material from Example 13 an elemental composition of 73.6 B-20.9 C-0.23 N-1.9 0-1.21 Al-2.20 Y (wt-%) was determined. By X-ray diffraction analysis the two yttrium aluminates $YAlO_3$ and $Y_3Al_5O_{12}$ with very little graphite and boron nitride were identified as secondary phases co-existent with boron carbide.

While several embodiments of the present invention have been shown and described, it is to be understood that many changes and modifications may be made without departing from the spirit and scope of the invention as defined in the appended claims.

We claim:

1. A substantially pore-free, sintered body comprising from about 90% by weight to about 99% by weight of boron carbide, having a B:C atomic ratio ranging from 3.8 to 4.5:1, 0 to 1% by weight free carbon, 0 to 1% by weight BN or AlN, remainder an oxide binder phase; said sintered body having a density of not more than 2.60 g/cm³, a substantially uniform microstructure composed of substantially, equiaxed grains of said boron carbide, having a mean grain size within the range of from 0.7 to about 12 μm; the oxide binder phase comprising at least a rare earth aluminate; the binder phase being present in a form of accumulations at multiple grain junctions, said sintered body having a porosity of not more than 1%, hardness (Knoop, 300 g) greater than 2400; four-point flexural strength of at least 400 MPa; and fracture toughness of at least 3.0 MPa·m^{1/2} measured by the Chevron Notch method.

2. The substantially pore-free sintered body of claim 1 wherein said oxide binder phase is at least one yttrium aluminate selected from the group $Y_3Al_5O_{12}$, $YAlO_3$, and $Y_4Al_2O_9$.

3. The substantially pore-free sintered body of claim 1 having the following properties: density of not more than 2.60 g/cm³, the boron carbide grains having a mean grain size from about 5 to about 12 μm, porosity of not more than 1%, hardness (HK0.3) greater than 2400; four-point flexural strength of at least 400 MPa; and fracture toughness of at least 3.0 MPa·m^{1/2} measured by the Chevron Notch method.

4. The substantially pore-free sintered body of claim 1 having the following properties: density of not more than 2.60 g/cm³, the boron carbide grains having a mean grain size from about 0.7 to about 3 μm, porosity of not more than 0.5%, hardness (HK0.3) of at least 2500; four-point flexural strength of at least 700 MPa; and fracture toughness of at least 3.5 MPa·m^{1/2} measured by the Chevron Notch method.

* * * * *